US012632287B2

(12) United States Patent
Kirubakaran et al.

(10) Patent No.: US 12,632,287 B2
(45) Date of Patent: May 19, 2026

(54) DYNAMIC INTERRUPT STEERING AND PROCESSOR UNIT IDLE STATE DEMOTION

(71) Applicant: Intel Corporation, Santa Clara, CA (US)

(72) Inventors: Deepak Samuel Kirubakaran, Hillsboro, OR (US); William A. Braun, Beaverton, OR (US); Rajshree A. Chabukswar, Sunnyvale, CA (US); Leigh Davies, Staffordshire (GB); Russell J. Fenger, Beaverton, OR (US); Alexander Gendler, Kiriat Motzkin (IL); Raoul V. Rivas Toledano, Hillsboro, OR (US); Eliezer Weissmann, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/342,476

(22) Filed: Jun. 8, 2021

(65) Prior Publication Data

US 2021/0294641 A1 Sep. 23, 2021

(51) Int. Cl.
*G06F 9/48* (2006.01)
*G06F 11/30* (2006.01)
*G06F 11/34* (2006.01)

(52) U.S. Cl.
CPC ........ *G06F 9/4818* (2013.01); *G06F 11/3024* (2013.01); *G06F 11/3433* (2013.01)

(58) Field of Classification Search
CPC . G06F 9/4818; G06F 11/3024; G06F 11/3433
See application file for complete search history.

(56) References Cited

U.S. PATENT DOCUMENTS 9,411,649 B2 8/2016 Tseng et al.
2007/0239917 A1 10/2007 Orita et al.
(Continued)

OTHER PUBLICATIONS

International Preliminary Report on Patentability for Application No. PCT/US2022/019178, issued Nov. 21, 2023, 6 Pages.
(Continued)

*Primary Examiner* — Henry Tsai
*Assistant Examiner* — Harry Z Wang
(74) *Attorney, Agent, or Firm* — Alliance IP, LLC

(57) ABSTRACT

Dynamic interrupt steering remaps the handling of interrupts away from processor units executing important workloads. During the operation of a computing system, important workload utilization rates for processor units handling interrupts are determined and those processor units with utilization rates about a threshold value are made unavailable for handling interrupts. Interrupts are dynamically remapped to processor units available for interrupt handling based on processor unit idle state and, in the case of heterogeneous computing systems, processor unit type. Processor units are capable of idle state demotion by, in response to receiving a request to enter into a deep idle state, determining if its interrupt handling rate is greater than a threshold value, and if so, placing itself into a shallower idle state than requested. This avoids the computing system from incurring the expensive idle state exit latency and power costs associated with exiting from a deep idle state.

25 Claims, 7 Drawing Sheets

(56) References Cited

U.S. PATENT DOCUMENTS

| | | | |
|---|---|---|---|
| 2010/0169673 A1* | 7/2010 | Saripalli | G06F 12/1081 |
| | | | 713/300 |
| 2011/0145461 A1* | 6/2011 | Zhao | G06F 9/505 |
| | | | 710/267 |
| 2013/0067132 A1* | 3/2013 | Guddeti | G06F 13/24 |
| | | | 710/260 |
| 2013/0318334 A1* | 11/2013 | Waskiewicz, Jr. | G06F 1/3203 |
| | | | 712/244 |
| 2015/0234640 A1* | 8/2015 | Tian | G06F 8/51 |
| | | | 717/149 |
| 2015/0301864 A1* | 10/2015 | Tseng | G06F 9/4881 |
| | | | 718/104 |
| 2016/0252943 A1* | 9/2016 | Varma | G06F 9/45558 |
| | | | 713/310 |
| 2017/0212851 A1* | 7/2017 | Jayasena | G06F 13/24 |
| 2018/0074849 A1* | 3/2018 | Vanka | G06F 9/505 |
| 2018/0268913 A1* | 9/2018 | Akkerman | G11C 29/76 |
| 2019/0004866 A1 | 1/2019 | Du et al. | |
| 2021/0249641 A1 | 8/2021 | Xu et al. | |

OTHER PUBLICATIONS

PCT International Search Report and Written Opinion in PCT International Application Serial No. PCT/US2022/019178 (9 pages).

* cited by examiner

400

DETERMINE IMPORTANT WORKLOAD UTILIZATION RATE FOR FIRST
PROCESSOR UNIT EXCEEDS THRESHOLD VALUE
410

REMAP HANDLING OF INTERRUPT TYPE FROM FIRST PROCESSOR UNIT TO
SECOND PROCESSOR UNIT
420

500

RECEIVE INSTRUCTION TO PLACE PROCESSOR UNIT INTO FIRST IDLE STATE
510

PLACE PROCESSOR UNIT IN SECOND IDLE STATE IF INTERRUPT HANDLING RATE FOR PROCESSOR UNIT EXCEEDS INTERRUPT HANDLING RATE THRESHOLD VALUE          520

PLACE PROCESSOR UNIT IN FIRST IDLE STATE IF INTERRUPT HANDLING RATE DOES NOT EXCEED THE INTERRUPT HANDLING RATE THRESHOLD VALUE
530

DYNAMIC INTERRUPT STEERING AND PROCESSOR UNIT IDLE STATE DEMOTION

BACKGROUND

In some existing computing devices, particular processor units are designated to handle particular interrupt types. If a processor unit designated to handle a particular interrupt type is in an idle state when an interrupt of that type occurs, the processor unit transitions from the idle state to an active state before handling the interrupt. In some existing computing devices, a processor unit can be placed into one of a variety of idle states. A processor unit transitioning from a deep idle state to an active state can incur greater latency and power idle state exit costs than if transitioning from a shallow idle state to an active state.

DETAILED DESCRIPTION

In some existing computing systems, system software steers interrupts to target processor units via IOMMU (Input-Output Memory Management Unit) interrupt remapping. Various policies are used in existing interrupt steering approaches. Interrupt steering can be dictated by platform or computing system capabilities through the programming of data structures referenced by the IOMMU (e.g., interrupt remapping table), through interrupt distribution policies (e.g., round-robin), or interrupt affinity. In an interrupt affinity approach, a device driver determines which processor unit handles interrupts originating from the device associated with the device driver. The device driver may designate processor units for handling the device interrupts without accounting for operating system or integrated circuit component architecture. In some cases, legacy device drivers assign interrupts to be handled by the processor unit responsible for booting up the computing system upon power-up (boot processor unit).

These existing interrupt approaches have various drawbacks. First, they are typically static approaches—processor units are assigned to handle various interrupt types at computing system startup and these assignments do not change during operation of the computing system. Second, they can scale the performance of a processor unit designated for handling interrupts based on DPC (deferred procedure calls) and ISR (interrupt service routine) load with a bias to routing interrupts toward the boot processor. This can preempt critical threads or processes executing on the processor unit, which can negatively impact computing system responsiveness and the user experience.

These existing approaches fail to account for the capabilities and real-time characteristics of the processor units available for handling interrupts, such as their latency, power consumption, idle state (e.g., C-state), and utilization associated with important workloads.

Figure 1:
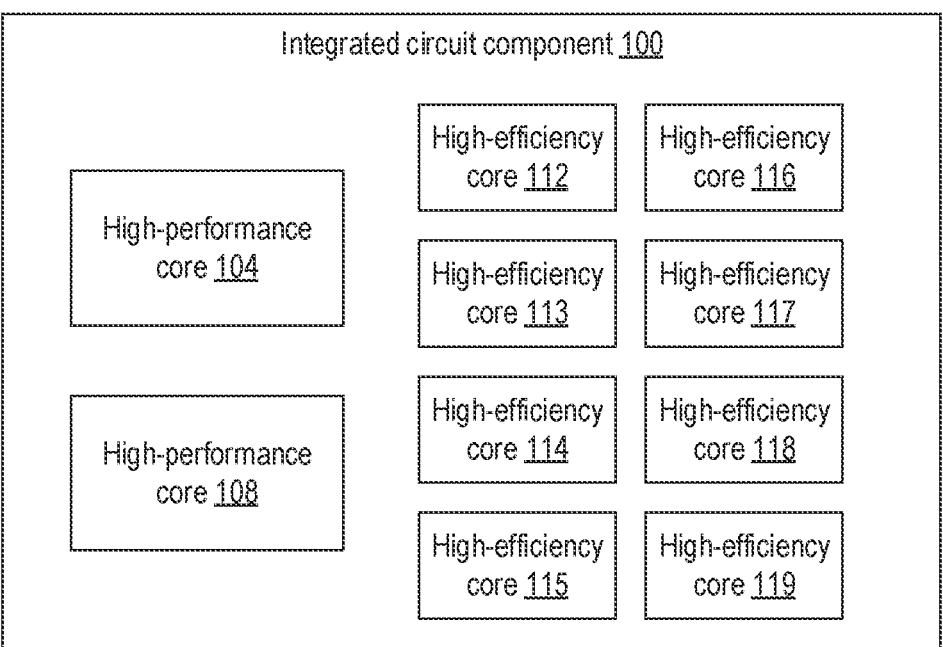
FIG. 1 is a block diagram of a heterogeneous integrated circuit component.

Computing systems employing the dynamic interrupt steering and idle state demotion technologies disclosed herein can provide improved system performance, battery life, and user experience. FIG. 1 is a block diagram of a heterogeneous integrated circuit component. The integrated circuit component 100 comprises two high-performance cores 104 and 108 and eight high-efficiency cores 112-119. If an operating system schedules critical rendering processes (the terms "critical" and "important" are used herein interchangeably) on the high-performance core 104 and the core 104 also happens to be the bootstrap processor, the core 104 may also be the processor unit to which the operating system steers interrupts by default. The preemption of critical rendering processes by the core 104 handling (or servicing) interrupts can result in frame rate degradation, which can lead to a reduced user experience, particularly in gaming and streaming scenarios. Further, interrupt steering to the high-performance cores 104 and 108 can result in battery life degradation if the cores 104 and 108 are repeatedly woken from a deep idle state for interrupt handling. In integrated circuit component architectures where high-performance cores are placed into deep idle states for power savings, the power cost of repeatedly waking these high-performance cores to handle interrupts can be significant.

The technologies disclosed herein can steer interrupts away from high-performance processor units to high-efficiency processor units to avoid impacting critical threads or processes being performed on the high-performance core. Analyses of the interrupt steering technologies disclosed herein show that steering interrupts from the processor unit that is designated for handling interrupts by default (such as the bootstrap processor unit) can increase the frames per second (FPS) of a popular gaming application by up to 2%. This corresponds to increasing the frequency of a processor unit by 1-2 bins. Emulation results also show performance gains of up to 15-20% in high interrupt rate scenarios (e.g. gaming with multiple streams) on next-generation platforms using the technologies described herein.

In addition to steering interrupts away from processor units performing important workloads, the technologies disclosed herein can also perform idle state demotion to prevent processor units that handle a high rate of interrupts from going into a deep idle state to avoid the expensive idle state exit costs when the processor unit exits from the deep idle state for interrupt handling.

As used herein, the term "integrated circuit component" refers to a packaged or unpacked integrated circuit product. A packaged integrated circuit component comprises one or more integrated circuit dies mounted on a package substrate with the integrated circuit dies and package substrate encapsulated in a casing material, such as a metal, plastic, glass, or ceramic. In one example, a packaged integrated circuit component contains one or more processor units mounted on a substrate with an exterior surface of the substrate comprising a solder ball grid array (BGA). In one example of an unpackaged integrated circuit component, a single monolithic integrated circuit die comprises solder bumps attached to contacts on the die. The solder bumps allow the die to be directly attached to a printed circuit board. An integrated circuit component can comprise one or more of any computing system component described or referenced herein or any other computing system component, such as a processor unit (e.g., system-on-a-chip (SoC), processor core, graphics processor unit (GPU), accelerator, chipset processor), I/O controller, memory, or network interface controller. As illustrated in FIG. 1 and discussed further in regard to FIG. 6 below, an integrated circuit component can be a heterogeneous integrated circuit component comprising multiple integrated circuit dies of different types.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform or resource, even though the software or firmware instructions are not actively being executed by the system, device, platform, or resource.

As used herein, the term "active state" when referring to the state of a processor unit refers to a state in which the processor unit is executing instructions. As used herein, the term "idle state" means a state in which a processor unit is not executing instructions. Modern processor units can have various sleep states in which they can be placed, with the varying idle states being distinguished by how much power the processor unit consumes in the idle state and idle state exit costs (e.g., how much time and how much power it takes for the processor unit to transition from the idle state to an active state). Idle states can be referred to as "shallow" or "deep", depending on idle state power consumption and idle state exit costs. An idle state can be referred to as "shallower" or "deeper" with respect to another idle state based on the amount of idle state power consumed and/or idle state exit costs relative to another idle state.

Idle states for some existing processor units can be referred to as "C-states". In one example of a set of idle states, some Intel® processors can be placed in C1, C1E, C3, C6, C7, and C8 idle states. This is in addition to a "C0" state, which is the processor's active state. (P-states can further describe the active state of some Intel® processors, with the various P-states indicating the processor's power supply voltage and operating frequency). The C1/C1E states are "auto halt" states in which all processes in a processor unit are performing a HALT or MWAIT instruction and the processor unit core clock is stopped. In the C1E state, the processor unit is operating in a state with its lowest frequency and supply voltage and with PLLs (phase-locked loops) still operating. In the C3 state, the processor unit's L1 (Level 1) and L2 (Level 2) caches are flushed to lower-level caches (e.g., L3 (Level 3) or LLC (last level cache)), the core clock and PLLs are stopped, and the processor unit operates at an operating voltage sufficient to allow it to maintain its state. In the C6 and deeper idle states, the processor unit stores its state to memory and its operating voltage is reduced to zero. As modern integrated circuit components can comprise multiple processor units, the individual processor units can be in their own idle states. These states can be referred to as C-states (core-states). Package C-states (PC-states) refer to idle states of integrated circuit components comprising multiple cores.

In the following description, specific details are set forth, but embodiments of the technologies described herein may be practiced without these specific details. Well-known circuits, structures, and techniques have not been shown in detail to avoid obscuring an understanding of this description. Phrases such as "an embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact. Furthermore, the terms "comprising," "including," "having," and the like, as used with respect to embodiments of the present disclosure, are synonymous.

Reference is now made to the drawings, which are not necessarily drawn to scale, wherein similar or same numbers may be used to designate same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Figure 2:
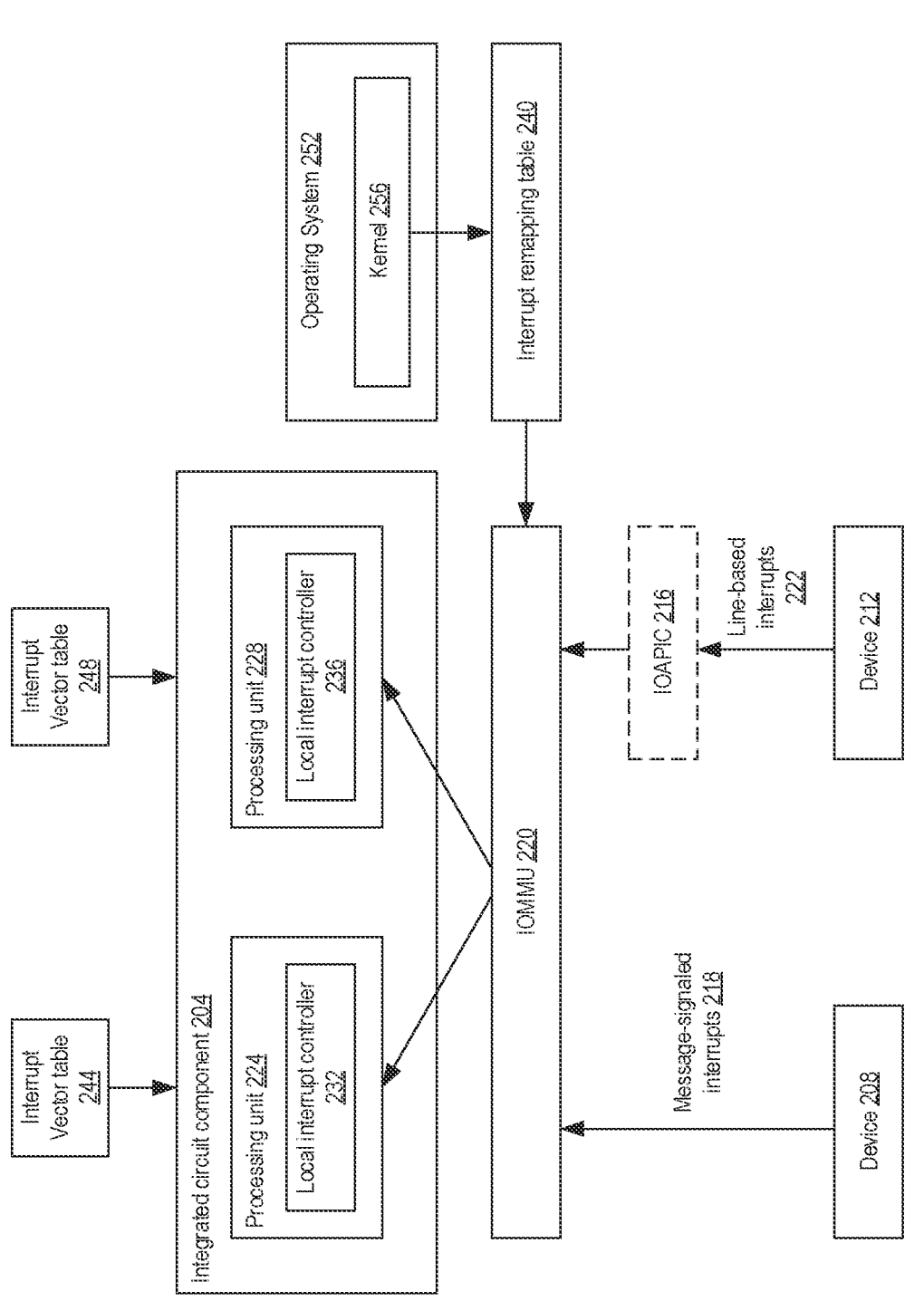
FIG. 2 is a simplified block diagram of an example computing system capable of performing dynamic interrupt steering.

FIG. 2 is a simplified block diagram of an example computing system capable of performing dynamic interrupt steering. The computing system 200 comprises an integrated circuit component 204, devices 208 and 212, and an IOMMU 220. Device 208 is capable of generating message-based interrupts 218 and device 212 is capable of generating line-based (or pin-based) interrupts 222. The IOMMU 220 has access to an interrupt remapping table 240 that specifies which processor units handle which interrupt types. An interrupt type for line-based interrupts can be determined by, for example, the line (or pin) that an interrupt signal is received on. For message-based interrupts, the interrupt type can be determined by, for example, the contents of the interrupt message (e.g., requester ID, address, message data for PCIe (Peripheral Component Interconnect express) message-signaled interrupts). The IOMMU 220 provides an interrupt to the processor unit indicated by the interrupt remapping table 240, where it is received by a local interrupt controller belonging to the target processing unit. The local interrupt controller manages the interrupts to be handled by a processor unit. The local interrupt controllers 232 and 236 are shown in FIG. 2 as being integrated into the processor units 224 and 228, respectively, but in other embodiments, local interrupt controllers can be located on an integrated circuit die separate from the processor unit. In some embodiments, the local interrupt controller is an Intel® Local Advanced Programmable Interrupt Controller (LAPIC) that is part of an Intel® Advanced Programmable Interrupt Controller (APIC). In such embodiments, the APIC can optionally comprise an I/O Advanced Programmable Interrupt Controller (I/O APIC), such as IOAPIC 216.

The processor units 224 and 228 refer to interrupt vector tables 244 and 248, respectively, to determine the interrupt handler that will be used to handle a received interrupt. In some embodiments, the interrupt vector tables are implemented as interrupt descriptor tables (IDTs).

Dynamic interrupt steering comprises editing the interrupt remapping table 240 during the operation of a computing system 200. The interrupt remapping table 240 can be modified by an operating system 252 (or hypervisor) that is executing on the computing system 200. In some embodiments, an operating system kernel 256 modifies the interrupt remapping table 240.

Figure 3:
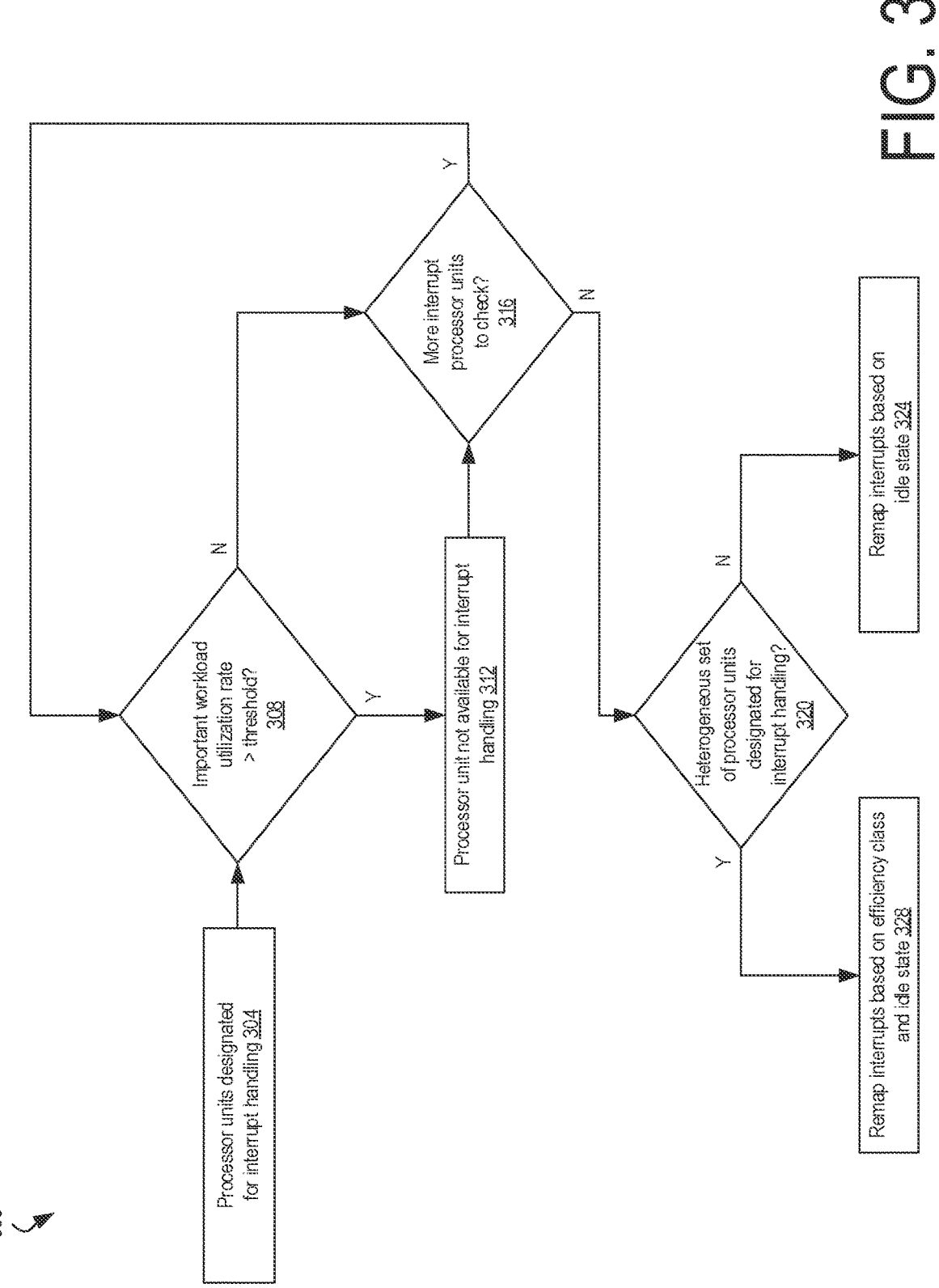
FIG. 3 is a flowchart of a first example dynamic interrupt steering method.

FIG. 3 is a flowchart of a first example dynamic interrupt steering method. The method 300 can be performed by an operating system or hypervisor executing on a computing system. At 308, for individual processor units in a set of processor units 304 designated for interrupt handling, the amount of time the processor unit has recently spent executing instructions associated with important workloads is determined. As used herein, the term "workload" can refer to a process or thread executing on a processor unit. This amount can be referred to as an important workload utilization rate or important C0% rate for the processor unit. The time interval over which the important workload utilization rate is determined can be of a predetermined length prior to the execution of the method 300, the time interval since a prior execution of the method 300, or another time interval. If the important workload utilization rate is greater than an important workload utilization rate threshold value, the processor unit is no longer designated as a processor unit for handling interrupts at 312 and important workloads executed on that processor unit will not be preempted by interrupt handling. At 316, the method 300 determines if additional processor units designated for interrupt handling are to be checked for possible removal from the set of processor units available for interrupt handling, and 308, 312, and 316 are repeated as needed until all processor units 304 have been checked. As a result of 308, 312, and 316 being performed for all processor units 304, fewer processor units may be left available for handling interrupts.

In other embodiments, the method 300 can check the important workload utilization rate for processor units that are capable of handling interrupts but that are not currently designated for interrupt handling due to their important workload utilization rate having exceeded the important workload utilization rate threshold value in a prior iteration of the method 300 and designate them as available again for handling interrupts if their important workload utilization rate has dropped back below the important workload utilization threshold value. Thus, in these embodiments, processor units can be added to or removed from the set of processor units available for interrupt handling based on their important workload utilization rate. In some embodiments, the important workload utilization threshold value for designating a processor unit as not available for interrupt handling can be a different threshold value than the important workload utilization threshold value used for designating that a processor unit is available again to handle interrupts.

The method 300 can utilize various metrics to determine whether instructions executed by a processor unit are associated with an important workload to determine an important workload utilization rate. Examples of such metrics include the priority of a thread or process associated with the instructions as determined by the operating system or hypervisor, whether the instructions are associated with an application that is operating in the foreground (foreground application) or on behalf of a foreground application, whether the instructions are associated with a user-initiated task (versus a scheduled background or maintenance task), whether the instructions are operating at an elevated privilege (such as an administrator privilege versus a default user privilege), and one or more energy-performance register values indicating how a processor unit operating mode is to be weighted toward higher performance or energy savings. In some Intel® processors, the one or more energy-performance registers can comprise an EPP (energy performance preference) register or an EPB (energy performance bias) register.

After the important workload utilization rates are checked for the processor units 304, the method 300 proceeds to 320. If the computing system is a heterogeneous computing system (the processor units available for interrupt handling comprise two or more different processor unit types), interrupts are remapped to one of the processor units available for interrupt handling based on processor type and idle state of the available processor units at 328. If the computing system is a homogeneous computing system (the processor units available for interrupt handling are of the same processor type), interrupts are remapped to one of the processor units available for interrupt handling based on the idle state of the available processor units at 324.

At 324 and 328, interrupt types routed to a processor unit that was removed at 312 from the set of processor units available for handling interrupts are remapped to one of the processor units that are still available for interrupt handling. Even if the set of processor units designated for handling interrupts remains unchanged after 308, 312, and 316 are performed, an interrupt may still be remapped to a new target processor unit in 324 or 328. This can be due to, for example, a processor unit designated for interrupt handling being placed into a deeper idle state due to its interrupt handling rate dropping below a threshold value, as will be discussed in greater detail below. In such a situation, interrupts steered to a processor unit that has been in a deeper idle state since the last iteration of the method 300 can be remapped to a processor unit that has a shallower idle state.

Reference to a processor unit's idle state in 324 and 328 can refer to the present idle state of the processor unit or, if the processor unit is in an active mode at the time the method 300 is performed, the most recent idle state in which the processor unit was placed. In some embodiments, the idle state for the processor unit can be the idle state that the processor unit was most commonly placed in since the last remapping of interrupts (e.g., since a prior execution of the method 300) or an idle state that the processor unit was most commonly placed in over a time interval prior to the execution of the method 300.

At 324 and 328, an interrupt type can be remapped from a first processor unit to a second processor unit if the idle state of the second processor unit is shallower than that of the first processor. In some embodiments, interrupt types can be steered away from processor units with an idle state of C3 or deeper. In this manner, interrupts are steered to processor units that have lower latency and power idle state exit costs. The selection of a second processor unit to remap to can comprise selecting the second processor unit from among a plurality of processor units available for interrupt handling. The second processor unit can be selected based on the second processor unit having a shallower idle state relative to at least one other processor unit in the plurality of units. The second processor unit can be selected based on the processor unit type of the second processor unit relative to the processor unit type of one or more other processor units in the plurality of processor units. In some embodiments, the second processor unit can be selected based on multiple factors of the second processor unit relative to one or more of the processor units in the plurality of units, such as the second processor unit idle state and the second processor unit processor unit type.

At 328, an interrupt type can be remapped from a first processor unit of a first processor unit type to a second processor unit of a second processor unit type, the second processor unit type being able to handle the type advantageously (e.g., faster, less power consumption) relative to the first processor unit type. A processor unit type can be represented by information indicating one or more processor unit characteristics, such as latency or power consumption. For example, in a heterogeneous system, an interrupt can be remapped from a high-performance processor unit ("high-performance" being the first processor unit type) to a high-efficiency processor unit ("high-efficiency" being the second processor unit type) that can handle the interrupt with less power consumed relative to the high-performance processor unit. The processor unit type can act as a proxy for idle state exit costs as a larger high-performance processor unit can take longer and consume more power to exit the same idle state as a smaller high-efficiency processor unit. Dynamically steering interrupts based on processor unit type can also allow for power savings in scenarios where high-performance processor units are entered into a deep idle state, such as in a "one hour of remaining battery life" (Hour of Battery life, or HoBL) context. The remapping of interrupts in 324 and 328 can comprise the operating system or hypervisor modifying an interrupt remapping table, such as table 240 in FIG. 2.

In some embodiments, the method 300 does not perform a check of whether the computing system is heterogeneous and proceeds to interrupt remapping after processor unit important workload utilization rates are checked. After an interrupt type has been remapped to a new target processor unit, any interrupts occurring after the remapping that are of the remapped interrupt type will be handled by the new target processor unit.

The method 300 can be performed on a periodic or another basis. If performed periodically, the method 300 can be performed at a predetermined time interval, a user-specified time interval, or another time interval. In some embodiments, interrupt remapping (e.g., 324 and 328 in FIG. 3) can occur independently of checking whether to make processor units unavailable for interrupt handling based on their important workload utilization rates (e.g., 308, 312, 316 in FIG. 3). The interrupt remapping can occur at the same frequency but offset in time from checking processor unit important workload utilization rates or at a different frequency than checking processor unit important workload utilization rates. The portion of the operating system that performs the dynamic interrupt steering illustrated in FIG. 3 can be referred to as a dynamic interrupt steering module.

As mentioned, interrupts can be dynamically steered from a processor unit that is in a deep idle to a processor unit that is in a shallow state so that lower idle state exit costs are incurred when the interrupt handling processor unit exits an idle state to handle an interrupt. The idle state demotion technologies described herein allow a processor unit that handles interrupts to avoid placing itself in a deep idle state to avoid expensive deep idle state exit costs.

Idle state demotion can occur when a processor unit receives an instruction to transition from an active state to a deep idle state. In response to receiving the instruction, the processor unit can determine whether to enter a shallower idle state than the deep idle state indicated in the instruction based on a recent interrupt handling rate for the processor unit. In some embodiments, the interrupt handling rate is determined in response to receiving the instruction to enter an idle state. An interrupt handling rate can be based on the number of interrupts a processor unit has been requested to handle within a time interval prior to receipt of the instruction to enter an idle state. The time interval can be a time interval of a pre-determined length (e.g., 10 ms, 5 ms), a time interval since the processor unit last entered an active state, or any other time interval. In some embodiments, the number of interrupts that the processor unit has been requested to handle can be based on the number of interrupt requests received by a local interrupt controller, such as local interrupt controllers 232 and 236 in FIG. 2. If the interrupt handling rate is greater than an interrupt handling rate threshold value (or interrupt handling rate demotion threshold value), the processor unit can enter a shallower idle state than requested so that lower idle state exit costs are incurred when the processor unit exits from an idle state to handle an interrupt. For example, if a processor unit receives a request to enter a C3 idle state and an interrupt handling rate for the processor unit is greater than the interrupt handling rate threshold value, the processor unit can demote the idle state and place itself into a C1 idle state. If the interrupt handling rate is less than the interrupt handling rate threshold, the processor unit can enter the idle state indicated in the instruction.

In some embodiments, the processor can use additional and/or different information to determine whether to enter a shallower idle state than requested. For example, an Intel® processor unit can utilize the receipt of an MWAIT instruction at the processor unit and/or the idle state indicated in a received MWAIT instruction in its determination of whether to perform idle state demotion and which idle state the processor unit should be placed into.

In some embodiments, an interrupt handling rate for a processor unit is determined periodically or on another basis and not in response to receiving an instruction to enter an idle state. The processor unit uses the most recently determined interrupt handling rate for the processor unit upon receipt of a request to enter into an idle state to determine whether the processor unit is to override the idle state request and place itself into a shallower idle state than indicated in the instruction.

In some embodiments, a processor unit can demote itself or undemote itself independently of receiving a request to enter an idle state. For example, if a processor unit is in a demoted idle state (e.g., a C1 state) due to a prior interrupt handling rate of the processor being greater than an interrupt handling rate demotion threshold value and the processor unit determines that a more recent interrupt handling rate is less than an interrupt handling rate undemotion threshold value, the processor unit can wake itself from the demoted idle state and take itself out of the demoted idle state. That is, the processor unit can place itself into a deeper idle state, such as a deeper idle state that the processor was instructed to enter in a prior instruction to enter an idle state received at the processor unit. In some embodiments, the interrupt handling rate demotion threshold value can be different than the interrupt handling rate undemotion threshold value.

In some embodiments, idle state demotion or undemotion for a processor unit can be performed based on interrupt handling rates of other processor units in the same integrated circuit component as the processor unit. For example, in an SoC or other integrated circuit component comprising multiple processor units, the idle state of a processor unit can be demoted if an average of interrupt handling rates for one or more other processor units in the integrated circuit component is greater than an interrupt handling rate SoC demotion threshold value and the interrupt handling rate for the processor unit is greater than an interrupt handling rate threshold value. The idle state of the processor unit can be undemoted if an average interrupt handling rate for the one or more other processor units is less than an interrupt handling rate SoC undemotion threshold value and the interrupt handling rate for the processor unit is less than an interrupt handling rate threshold demotion value. The interrupt handling rate SoC demotion threshold value and the interrupt handling rate SoC undemotion value can be different values.

In some embodiments, idle state demotion can be performed by processor unit microcode stored in processor unit memory. The portion of the processor unit microcode that performs idle state demotion can be referred to as an idle state demotion module. In other embodiments, idle state demotion can be performed by the processor unit executing operating system or hypervisor instructions. The portion of the operating system or hypervisor that performs idle state demotion can also be referred to as an idle state demotion module.

Any of the modules described herein can be combined into a single module, and a single module can be split into multiple modules. Moreover, any of the modules described herein can be part of an operating system or hypervisor of a computing device, one or more software applications independent of the operating system or hypervisor, or operate at another software layer. Any of the modules described herein can be implemented in software, hardware, firmware, or combinations thereof. A computer device referred to as being programmed to perform a method can be programmed to perform the method via software, hardware, firmware, or combinations thereof.

Figure 4:
FIG. 4 is a flowchart of a second example dynamic interrupt steering method.
Figure 4:
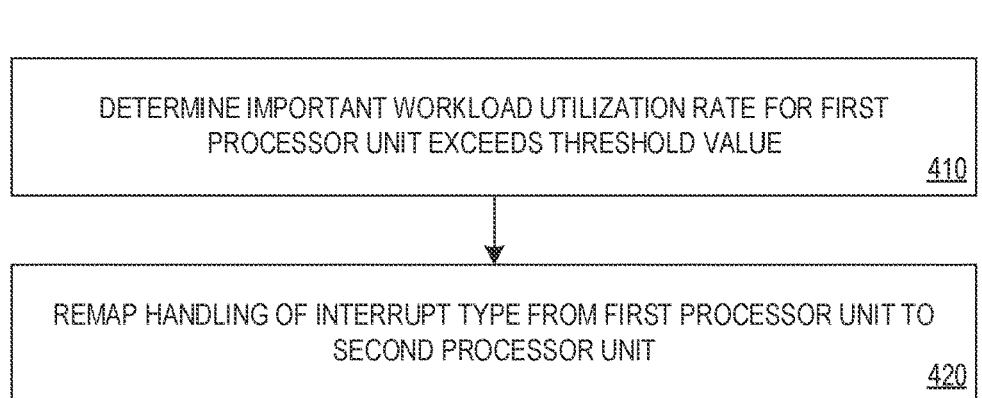

FIG. 4 is a flowchart of a second example dynamic interrupt steering method. The method 400 can be performed by an operating system kernel operating on a mobile computing device. At 410, an important workload utilization rate for a first processor unit is determined to exceed an important workload utilization threshold value. The first processor unit is designated to handle one or more interrupt types. At 420, handling of at least one of the one or more interrupt types is remapped from the first processor unit to a second processor unit.

In other embodiments, the method 400 can comprise one or more additional elements. For example, the method 400 can further comprise receiving an interrupt having an interrupt type of the at least one of the one or more interrupt types and handling the interrupt by the second processor unit. In another example, the method 400 comprises determining the important workload utilization rate for the first processor unit. In a further example, the method 400 further comprises selecting the second processor unit from a plurality of processor units.

Figure 5:
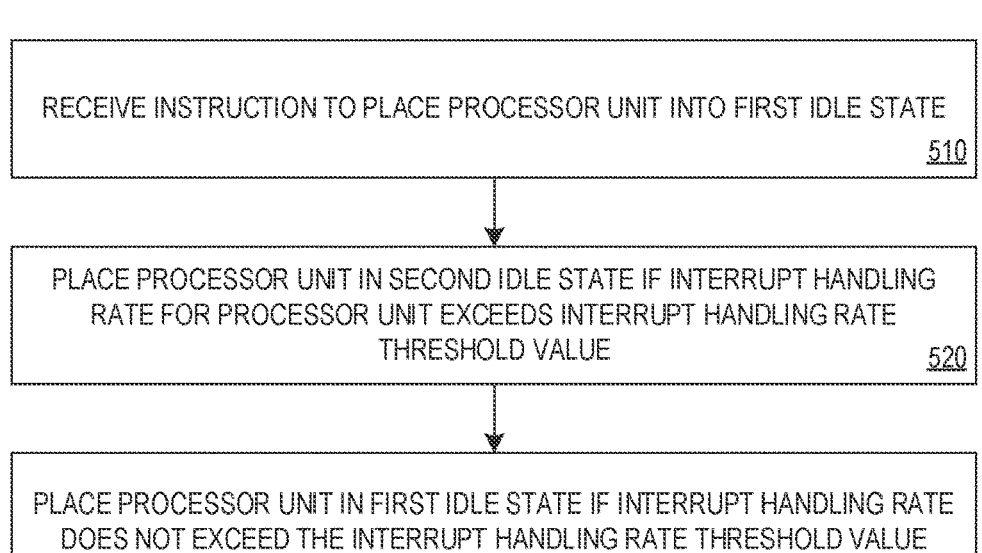
FIG. 5 is a flowchart of an example processor unit idle state demotion method.

FIG. 5 is a flowchart of an example processor unit idle state demotion method. The method 500 can be performed by, for example, a smaller high-efficiency processing unit in an integrated circuit component having a heterogeneous architecture. At 510, an instruction to place the processor unit into a first idle state can be received at the processor unit. At 520, the processor unit is placed in a second idle state if an interrupt handling rate for the processor unit exceeds an interrupt handling rate threshold value. The second idle state is a shallower idle state than the first idle state. At 530, the processor unit is placed in the first idle state if the interrupt handling rate for the processor unit does not exceed the interrupt handling rate threshold value.

In other embodiments, the method 500 can comprise one or more additional elements. For example, the method 500 can further comprise determining the interrupt handling rate for the processor unit. In another example, the method 500 can further comprise the processor unit transitioning from the second idle state to an active state, handling an interrupt by the processor unit, and transitioning the processor unit from the active state back to the second idle state.

The technologies described herein can be performed by or implemented in any of a variety of computing systems, including mobile computing systems (e.g., smartphones, handheld computers, tablet computers, laptop computers, portable gaming consoles, 2-in-1 convertible computers, portable all-in-one computers), non-mobile computing systems (e.g., desktop computers, servers, workstations, stationary gaming consoles, set-top boxes, smart televisions, rack-level computing solutions (e.g., blade, tray, or sled computing systems)), and embedded computing systems (e.g., computing systems that are part of a vehicle, smart home appliance, consumer electronics product or equipment, manufacturing equipment). As used herein, the term "computing system" includes computing devices and includes systems comprising multiple discrete physical components. In some embodiments, the computing systems are located in a data center, such as an enterprise data center (e.g., a data center owned and operated by a company and typically located on company premises), managed services data center (e.g., a data center managed by a third party on behalf of a company), a colocated data center (e.g., a data center in which data center infrastructure is provided by the data center host and a company provides and manages their own data center components (servers, etc.)), cloud data center (e.g., a data center operated by a cloud services provider that host companies applications and data), and an edge data center (e.g., a data center, typically having a smaller footprint than other data center types, located close to the geographic area that it serves).

Figure 6:
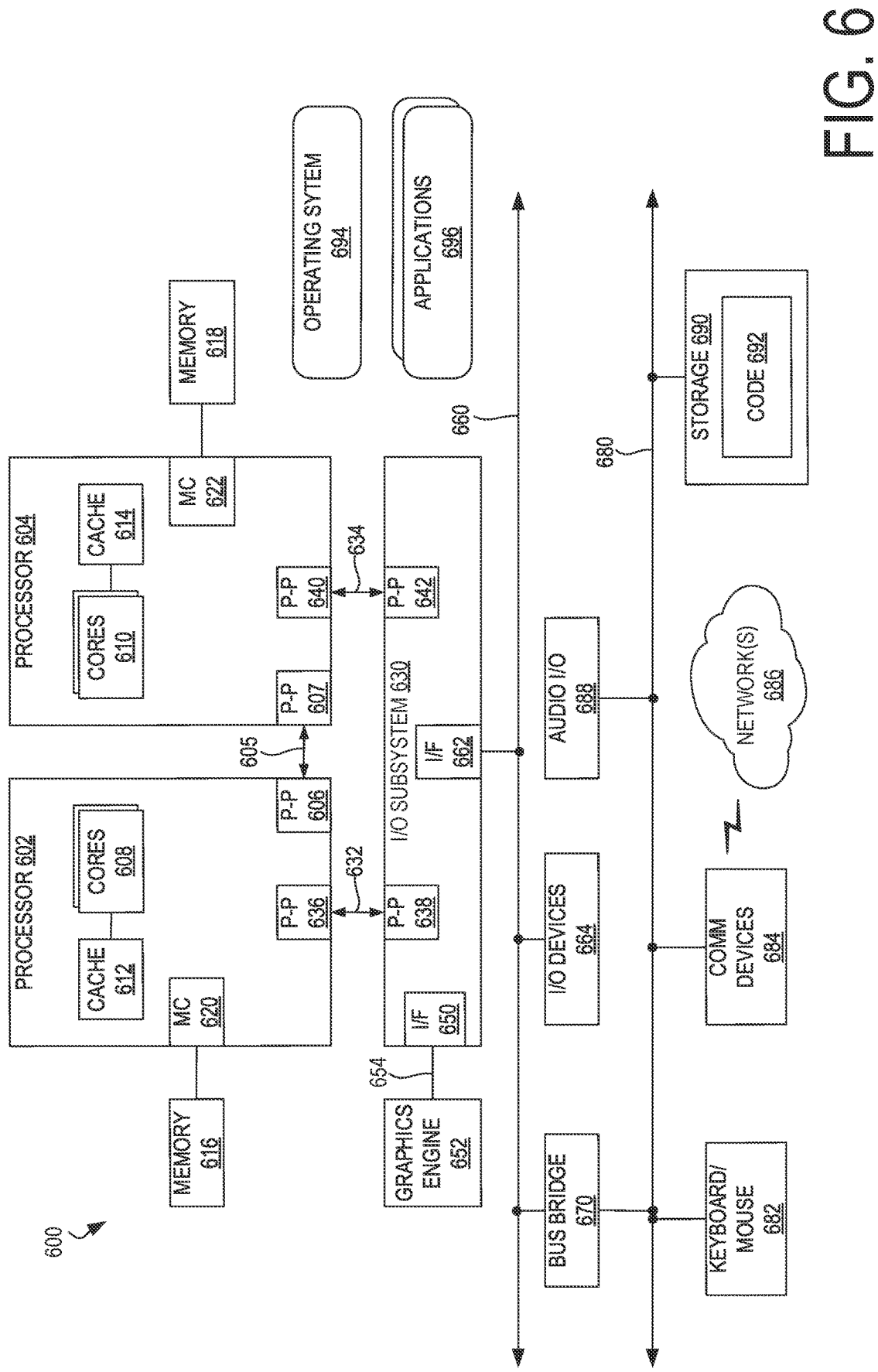
FIG. 6 is a block diagram of an example computing device capable of implementing technologies described herein.

FIG. 6 is a block diagram of a second example computing system in which technologies described herein may be implemented. Generally, components shown in FIG. 6 can communicate with other shown components, although not all connections are shown, for ease of illustration. The computing system 600 is a multiprocessor system comprising a first processor unit 602 and a second processor unit 604 comprising point-to-point (P-P) interconnects. A point-to-point (P-P) interface 606 of the processor unit 602 is coupled to a point-to-point interface 607 of the processor unit 604 via a point-to-point interconnection 605. It is to be understood that any or all of the point-to-point interconnects illustrated in FIG. 6 can be alternatively implemented as a multi-drop bus, and that any or all buses illustrated in FIG. 6 could be replaced by point-to-point interconnects.

The processor units 602 and 604 comprise multiple processor cores. Processor unit 602 comprises processor cores 608 and processor unit 604 comprises processor cores 610. Processor cores 608 and 610 can execute computer-executable instructions in a manner similar to that discussed below in connection with FIG. 7, or other manners.

Processor units 602 and 604 further comprise cache memories 612 and 614, respectively. The cache memories 612 and 614 can store data (e.g., instructions) utilized by one or more components of the processor units 602 and 604, such as the processor cores 608 and 610. The cache memories 612 and 614 can be part of a memory hierarchy for the computing system 600. For example, the cache memories 612 can locally store data that is also stored in a memory 616 to allow for faster access to the data by the processor unit 602. In some embodiments, the cache memories 612 and 614 can comprise multiple cache levels, such as level 1 (L1), level 2 (L2), level 3 (L3), level 4 (L4), and/or other caches or cache levels, such as a last level cache (LLC). Some of these cache memories (e.g., L2, L3, L4, LLC) can be shared among multiple cores in a processor unit. One or more of the higher cache levels (the smaller and faster caches) in the memory hierarchy can be located on the same integrated circuit die as a processor core and one or more of the lower cache levels (the larger and slower caches) can be located on integrated circuit dies that are physically separate from the processor core integrated circuit dies.

Although the computing system 600 is shown with two processor units, the computing system 600 can comprise any number of processor units. Further, a processor unit can comprise any number of processor cores. A processor unit can take various forms such as a central processing unit (CPU), a graphics processing unit (GPU), general-purpose GPU (GPGPU), accelerated processing unit (APU), field-programmable gate array (FPGA), neural network processing unit (NPU), data processor unit (DPU), accelerator (e.g., graphics accelerator, digital signal processor (DSP), compression accelerator, artificial intelligence (AI) accelerator), controller, or other types of processor units. As such, the processor unit can be referred to as an XPU (or xPU). Further, a processor unit can comprise one or more of these various types of processor units. In some embodiments, the computing system comprises one processor unit with multiple cores, and in other embodiments, the computing system comprises a single processor unit with a single core. As used herein, the terms "processor unit" and "processing unit" can refer to any processor, processor core, component, module, engine, circuitry, or any other processing element described or referenced herein.

In some embodiments, the computing system 600 can comprise one or more processor units that are heterogeneous or asymmetric to another processor unit in the computing system. There can be a variety of differences between the processor units in a system in terms of a spectrum of metrics of merit including architectural, microarchitectural, thermal, power consumption characteristics, and the like. These differences can effectively manifest themselves as asymmetry and heterogeneity among the processor units in a system.

The processor units 602 and 604 can be located in a single integrated circuit component (such as a multi-chip package (MCP) or multi-chip module (MCM)) or they can be located in separate integrated circuit components. An integrated circuit component comprising one or more processor units can comprise additional components, such as embedded DRAM, stacked high bandwidth memory (HBM), shared cache memories (e.g., L3, L4, LLC), input/output (I/O) controllers, or memory controllers. Any of the additional components can be located on the same integrated circuit die as a processor unit, or on one or more integrated circuit dies separate from the integrated circuit dies comprising the processor units. In some embodiments, these separate integrated circuit dies can be referred to as "chiplets". In some embodiments where there is heterogeneity or asymmetry among processor units in a computing system, the heterogeneity or asymmetry can be among processor units located in the same integrated circuit component. In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof.

Processor units 602 and 604 further comprise memory controller logic (MC) 620 and 622. As shown in FIG. 6, MCs 620 and 622 control memories 616 and 618 coupled to the processor units 602 and 604, respectively. The memories 616 and 618 can comprise various types of volatile memory (e.g., dynamic random-access memory (DRAM), static random-access memory (SRAM)) and/or non-volatile memory (e.g., flash memory, chalcogenide-based phase-change non-volatile memories), and comprise one or more layers of the memory hierarchy of the computing system. While MCs 620 and 622 are illustrated as being integrated into the processor units 602 and 604, in alternative embodiments, the MCs can be external to a processor unit.

Processor units 602 and 604 are coupled to an Input/Output (I/O) subsystem 630 via point-to-point interconnections 632 and 634. The point-to-point interconnection 632 connects a point-to-point interface 636 of the processor unit 602 with a point-to-point interface 638 of the I/O subsystem 630, and the point-to-point interconnection 634 connects a point-to-point interface 640 of the processor unit 604 with a point-to-point interface 642 of the I/O subsystem 630. Input/Output subsystem 630 further includes an interface 650 to couple the I/O subsystem 630 to a graphics engine 652. The I/O subsystem 630 and the graphics engine 652 are coupled via a bus 654.

The Input/Output subsystem 630 is further coupled to a first bus 660 via an interface 662. The first bus 660 can be a Peripheral Component Interconnect Express (PCIe) bus or any other type of bus. Various I/O devices 664 can be coupled to the first bus 660. A bus bridge 670 can couple the first bus 660 to a second bus 680. In some embodiments, the second bus 680 can be a low pin count (LPC) bus. Various devices can be coupled to the second bus 680 including, for example, a keyboard/mouse 682, audio I/O devices 688, and a storage device 690, such as a hard disk drive, solid-state drive, or another storage device for storing computer-executable instructions (code) 692 or data. The code 692 can comprise computer-executable instructions for performing methods described herein. Additional components that can be coupled to the second bus 680 include communication device(s) 684, which can provide for communication between the computing system 600 and one or more wired or wireless networks 686 (e.g. Wi-Fi, cellular, or satellite networks) via one or more wired or wireless communication links (e.g., wire, cable, Ethernet connection, radio-frequency (RF) channel, infrared channel, Wi-Fi channel) using one or more communication standards (e.g., IEEE 802.11 standard and its supplements).

Any of the computing system components illustrated in FIG. 6 or any other components that can be a part of a computing system are capable of generating an interrupt that is to be serviced by a processor unit in the computing system. Depending on the interconnection between the component and the processor unit, the interrupt can be a line-based (or pin-based) interrupt or a message-signaled interrupt.

In embodiments where the communication devices 684 support wireless communication, the communication devices 684 can comprise wireless communication components coupled to one or more antennas to support communication between the computing system 600 and external devices. The wireless communication components can support various wireless communication protocols and technologies such as Near Field Communication (NFC), IEEE 802.11 (Wi-Fi) variants, WiMax, Bluetooth, Zigbee, 4G Long Term Evolution (LTE), Code Division Multiplexing Access (CDMA), Universal Mobile Telecommunication System (UMTS) and Global System for Mobile Telecommunication (GSM), and 5G broadband cellular technologies. In addition, the wireless modems can support communication with one or more cellular networks for data and voice communications within a single cellular network, between cellular networks, or between the computing system and a public switched telephone network (PSTN).

The system 600 can comprise removable memory such as flash memory cards (e.g., SD (Secure Digital) cards), memory sticks, Subscriber Identity Module (SIM) cards. The memory in system 600 (including caches 612 and 614, memories 616 and 618, and storage device 690) can store data and/or computer-executable instructions for executing an operating system 694 and application programs 696. Example data includes web pages, text messages, images, sound files, and video data to be sent to and/or received from one or more network servers or other devices by the system 600 via the one or more wired or wireless networks 686, or for use by the system 600. The system 600 can also have access to external memory or storage (not shown) such as external hard drives or cloud-based storage.

The operating system 694 can control the allocation and usage of the components illustrated in FIG. 6 and support the one or more application programs 696. The application programs 696 can include common computing system applications (e.g., email applications, calendars, contact managers, web browsers, messaging applications) as well as other computing applications.

In some embodiments, a hypervisor (or virtual machine manager) operates on the operating system 694 and the application programs 696 operate within one or more virtual machines operating on the hypervisor. In these embodiments, the hypervisor is a type-2 or hosted hypervisor as it is running on the operating system 694. In other hypervisor-based embodiments, the hypervisor is a type-1 or "bare-metal" hypervisor that runs directly on the platform resources of the computing system 600 without an intervening operating system layer.

In some embodiments, the applications 696 can operate within one or more containers. A container is a running instance of a container image, which is a package of binary images for one or more of the applications 696 and any libraries, configuration settings, and any other information that one or more applications 696 need for execution. A container image can conform to any container image format, such as Docker®, Appc, or LXC container image formats. In container-based embodiments, a container runtime engine, such as Docker Engine, LXC, or an open container initiative (OCI)-compatible container runtime (e.g., Railcar, CRI-O) operates on the operating system (or virtual machine monitor) to provide an interface between the containers and the operating system 694. An orchestrator can be responsible for management of the computing system 600 and various container-related tasks such as deploying container images to the computing system 600, monitoring the performance of deployed containers, and monitoring the utilization of the resources of the computing system 600.

The computing system 600 can support various additional input devices, such as a touchscreen, microphone, monoscopic camera, stereoscopic camera, trackball, touchpad, trackpad, proximity sensor, light sensor, electrocardiogram (ECG) sensor, PPG (photoplethysmogram) sensor, galvanic skin response sensor, and one or more output devices, such as one or more speakers or displays. Other possible input and output devices include piezoelectric and other haptic I/O devices. Any of the input or output devices can be internal to, external to, or removably attachable with the system 600. External input and output devices can communicate with the system 600 via wired or wireless connections.

In addition, the computing system 600 can provide one or more natural user interfaces (NUIs). For example, the operating system 694 or applications 696 can comprise speech recognition logic as part of a voice user interface that allows a user to operate the system 600 via voice commands. Further, the computing system 600 can comprise input devices and logic that allows a user to interact with the computing system 600 via body, hand, or face gestures.

The system 600 can further include at least one input/output port comprising physical connectors (e.g., USB, IEEE 1394 (FireWire), Ethernet, RS-232), a power supply (e.g., battery), a global satellite navigation system (GNSS) receiver (e.g., GPS receiver); a gyroscope; an accelerometer; and/or a compass. A GNSS receiver can be coupled to a GNSS antenna. The computing system 600 can further comprise one or more additional antennas coupled to one or more additional receivers, transmitters, and/or transceivers to enable additional functions.

In addition to those already discussed, integrated circuit components and other components in the computing system 600 can communicate with interconnect technologies such as Intel® QuickPath Interconnect (QPI), Intel® Ultra Path Interconnect (UPI), Compute Express Link (CXL), cache coherent interconnect for accelerators (CCIX®), serializer/deserializer (SERDES), Nvidia® NVLink, ARM Infinity Link, Gen-Z, or Open Coherent Accelerator Processor Interface (OpenCAPI). Other interconnect technologies may be used and a computing system 600 may utilize one or more interconnect technologies.

It is to be understood that FIG. 6 illustrates only one example computing system architecture. Computing systems based on alternative architectures can be used to implement technologies described herein. For example, instead of the processors 602 and 604 and the graphics engine 652 being located on discrete integrated circuits, a computing system can comprise an SoC (system-on-a-chip) integrated circuit incorporating multiple processors, a graphics engine, and additional components. Further, a computing system can connect its constituent components via bus or point-to-point configurations different from that shown in FIG. 6. Moreover, the illustrated components in FIG. 6 are not required or all-inclusive, as shown components can be removed and other components added in alternative embodiments.

Figure 7:
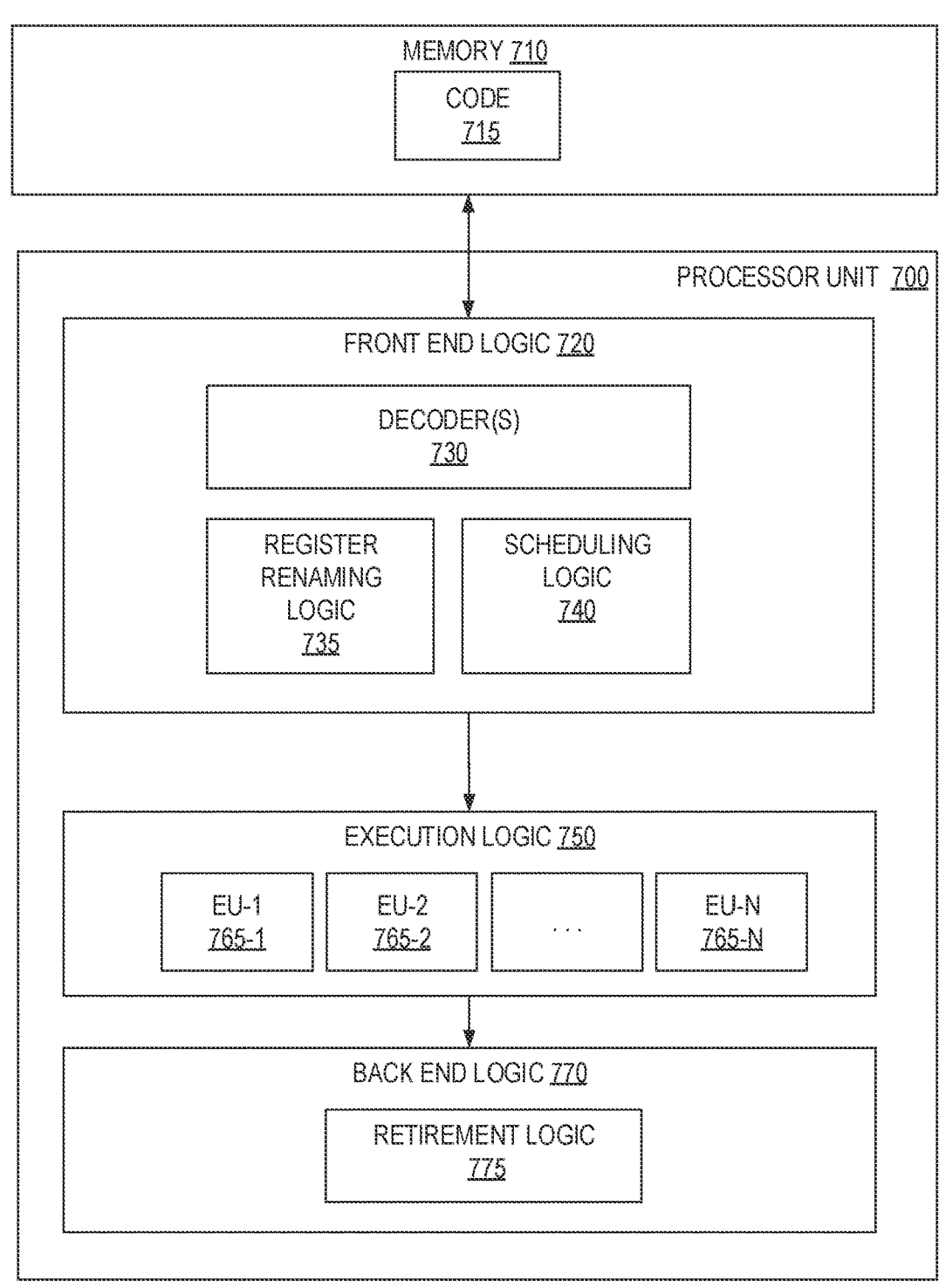
FIG. 7 is a block diagram of an example processor unit that can execute instructions as part of implementing technologies described herein.

FIG. 7 is a block diagram of an example processor unit 700 to execute computer-executable instructions as part of implementing technologies described herein. The processor unit 700 can be a single-threaded core or a multithreaded core in that it may include more than one hardware thread context (or "logical processor") per processor unit.

FIG. 7 also illustrates a memory 710 coupled to the processor unit 700. The memory 710 can be any memory described herein or any other memory known to those of skill in the art. The memory 710 can store computer-executable instructions 715 (code) executable by the processor unit 700.

The processor unit comprises front-end logic 720 that receives instructions from the memory 710. An instruction can be processed by one or more decoders 730. The decoder 730 can generate as its output a micro-operation such as a fixed width micro operation in a predefined format, or generate other instructions, microinstructions, or control signals, which reflect the original code instruction. The front-end logic 720 further comprises register renaming logic 735 and scheduling logic 740, which generally allocate resources and queues operations corresponding to converting an instruction for execution.

The processor unit 700 further comprises execution logic 750, which comprises one or more execution units (EUs) 765-1 through 765-N. Some processor unit embodiments can include a number of execution units dedicated to specific functions or sets of functions. Other embodiments can include only one execution unit or one execution unit that can perform a particular function. The execution logic 750 performs the operations specified by code instructions. After completion of execution of the operations specified by the code instructions, back-end logic 770 retires instructions using retirement logic 775. In some embodiments, the processor unit 700 allows out-of-order execution but requires in-order retirement of instructions. Retirement logic 775 can take a variety of forms as known to those of skill in the art (e.g., re-order buffers or the like).

The processor unit 700 is transformed during execution of instructions, at least in terms of the output generated by the decoder 730, hardware registers and tables utilized by the register renaming logic 735, and any registers (not shown) modified by the execution logic 750.

As used herein, the term "module" refers to logic that may be implemented in a hardware component or device, software or firmware running on a processor unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processor units, state machine circuitry, and/or firmware that stores instructions executable by programmable circuitry. Modules described herein may, collectively or individually, be embodied as circuitry that forms a part of a computing system. Thus, any of the modules can be implemented as circuitry, such as interrupt handling rate determination circuitry or idle state demotion circuitry. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processor units capable of executing computer-executable instructions to perform any of the disclosed methods. As used herein, the term "computer" refers to any computing system, device, or machine described or mentioned herein as well as any other computing system, device, or machine capable of executing instructions. Thus, the term "computer-executable instruction" refers to instructions that can be executed by any computing system, device, or machine described or mentioned herein as well as any other computing system, device, or machine capable of executing instructions.

The computer-executable instructions or computer program products as well as any data created and/or used during implementation of the disclosed technologies can be stored on one or more tangible or non-transitory computer-readable storage media, such as volatile memory (e.g., DRAM, SRAM), non-volatile memory (e.g., flash memory, chalcogenide-based phase-change non-volatile memory) optical media discs (e.g., DVDs, CDs), and magnetic storage (e.g., magnetic tape storage, hard disk drives). Computer-readable storage media can be contained in computer-readable storage devices such as solid-state drives, USB flash drives, and memory modules. Alternatively, any of the methods disclosed herein (or a portion) thereof may be performed by hardware components comprising non-programmable circuitry. In some embodiments, any of the methods herein can be performed by a combination of non-programmable hardware components and one or more processor units executing computer-executable instructions stored on computer-readable storage media.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, assembly language, or any other programming language. Likewise, the disclosed technologies are not limited to any particular computer system or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

As used in this application and the claims, a list of items joined by the term "and/or" can mean any combination of the listed items. For example, the phrase "A, B and/or C" can mean A; B; C; A and B; A and C; B and C; or A, B and C. As used in this application and the claims, a list of items joined by the term "at least one of" can mean any combination of the listed terms. For example, the phrase "at least one of A, B or C" can mean A; B; C; A and B; A and C; B and C; or A, B, and C. Moreover, as used in this application and the claims, a list of items joined by the term "one or more of" can mean any combination of the listed terms. For example, the phrase "one or more of A, B and C" can mean A; B; C; A and B; A and C; B and C; or A, B, and C.

The disclosed methods, apparatuses, and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

The following examples pertain to additional embodiments of technologies disclosed herein.

Example 1 is a method comprising: during operation of a computing device: determining that an important workload utilization rate for a first processor unit exceeds an important workload utilization threshold value, the first processor unit designated to handle one or more interrupt types; and remapping handling of the one or more interrupt types from the first processor unit to a second processor unit.

Example 2 comprises the method of Example 1, further comprising: receiving an interrupt having an interrupt type of one of the interrupt types; and handling the interrupt by the second processor unit.

Example 3 comprises the method of Example 1 or 2, wherein the remapping comprises modifying an interrupt remapping table.

Example 4 comprises the method of any one of Examples 1-3, further comprising determining the important workload utilization rate for the first processor unit.

Example 5 comprises the method of Example 4, wherein the important workload utilization rate is determined based on a process priority or a thread priority associated with instructions performed by the first processor unit over a time interval for which the important workload utilization rate is determined.

Example 6 comprises the method of Example 4, wherein the important workload utilization rate is determined based on whether instructions executed by the first processor unit during a time interval for which the important workload utilization rate is determined are associated with a foreground application.

Example 7 comprises the method of Example 4, wherein the important workload utilization rate is determined based on whether instructions executed by the first processor unit during a time interval for which the important workload utilization rate is determined are associated with a user-initiated task.

Example 8 comprises the method of Example 4, wherein the important workload utilization rate is determined based on whether instructions executed by the first processor unit during a time interval for which the important workload utilization rate is determined are operating at an elevated privilege.

Example 9 comprises the method of any one of Examples 1-8, wherein the second processor unit belongs to a plurality of processor units, the method further comprising selecting the second processor unit from the plurality of processor units.

Example 10 comprises the method of Example 9, wherein the second processor unit is selected from the plurality of processor units based on an idle state of the second processor unit.

Example 11 comprises the method of Example 9, wherein the second processor unit is selected from the plurality of processor units based on an idle state of the second processor unit being shallower than an idle state of at least one other processor unit of the plurality of processor units.

Example 12 comprises the method of Example 9z, wherein the second processor unit is selected based on a processor unit type of the second processor unit.

Example 13 comprises the method of any one of Examples 1-12, wherein the important workload utilization rate is a first important workload utilization rate determined over a first time interval, the method further comprising: determining that a second important workload utilization rate for the first processor unit determined over a second time interval does not exceed the important workload utilization threshold value, the second time interval occurring later than the first time interval; and remapping handling of the one or more interrupt types from the second processor unit back to the first processor unit.

Example 14 is a method comprising: receiving an instruction to place a processor unit into a first idle state; placing the processor unit in a second idle state if an interrupt handling rate for the processor unit exceeds an interrupt handling rate threshold value, the second idle state being a shallower idle state than the first idle state; and placing the processor unit in the first idle state if the interrupt handling rate for the processor unit does not exceed the interrupt handling rate threshold value.

Example 15 comprises the method of Example 14, further comprising determining the interrupt handling rate for the processor unit.

Example 16 comprises the method of Example 14 or 15, wherein the interrupt handling rate is determined over a time interval of a pre-determined length prior to the receiving of the instruction to place the processor unit into the first idle state.

Example 17 comprises the method of Example 14 or 15, wherein the interrupt handling rate is determined over a time interval since the processor unit last entered an active state.

Example 18 comprises the method of any one of Examples 14-17, further comprising: the processor unit transitioning from the second idle state to an active state; handling an interrupt by the processor unit; and transitioning the processor unit from the active state back to the second idle state after the interrupt has been handled by the processor unit.

Example 19 comprises the method of any one of Examples 14-18, wherein the method is performed by microcode stored in processor unit memory.

Example 20 is one or more non-transitory computer-readable storage media having instructions stored thereon that, when executed, cause one or more processor units to perform any one of the methods of Examples 1-19.

Example 21 is a computing device comprising: one or more processor units; and one or more non-transitory computer-readable media having instructions stored thereon that, when executed, cause the one or more processor units to: during operation of the computing device: determine that an important workload utilization rate for a first processor unit exceeds an important workload utilization threshold value, the first processor unit designated to handle one or more interrupt types; and remap handling of the one or more interrupt types from the first processor unit to a second processor unit, wherein the one or more processor units comprise the first processor unit.

Example 22 comprises the computing device of Example 21, wherein the instructions are to further cause the one or more processor units to: receive an interrupt having an interrupt type of one of the interrupt types; and handle the interrupt by the second processor unit.

Example 23 comprises the computing device of Example 21 or 22, wherein to remap handling of the one or more interrupt types comprises to modify an interrupt remapping table.

Example 24 comprises the computing device of any one of Examples 21-23, wherein the instructions are to further cause the one or more processor units to determine the important workload utilization rate for the first processor unit.

Example 25 comprises the computing device of Example 24, wherein the important workload utilization rate is to be determined based on a process priority or a thread priority associated with instructions performed by the first processor unit over a time interval for which the important workload utilization rate is determined.

Example 26 comprises the computing device of Example 24, wherein the important workload utilization rate is to be determined based on whether instructions executed by the first processor unit during a time interval for which the important workload utilization rate is determined are associated with a foreground application.

Example 27 comprises the computing device of Example 24, wherein the important workload utilization rate is to be determined based on whether instructions executed by the first processor unit during a time interval for which the important workload utilization rate is determined are associated with a user-initiated task.

Example 28 comprises the computing device of Example 24, wherein the important workload utilization rate is to be determined based on whether instructions executed by the first processor unit during a time interval for which the important workload utilization rate is determined are operating at an elevated privilege.

Example 29 comprises the computing device of any one of Examples 21-28, wherein the second processor unit belongs to a plurality of processor units, wherein the instructions are to further cause the one or more processor units to select the second processor unit from the plurality of processor units.

Example 30 comprises the computing device of Example 29, wherein the second processor unit is to be selected from the plurality of processor units based on an idle state of the second processor unit.

Example 31 comprises the computing device of Example 29, wherein the second processor unit is to be selected from the plurality of processor units based on an idle state of the second processor unit being shallower than an idle state of at least one other processor unit of the plurality of processor units.

Example 32 comprises the computing device of Example 29, wherein the second processor unit is to be selected based on a processor unit type of the second processor unit.

Example 33 comprises the computing device of any one of Examples 21-32, wherein the important workload utilization rate is a first important workload utilization rate determined over a first time interval, the instructions are to further cause the one or more processor units to: determine that a second important workload utilization rate for the first processor unit determined over a second time interval does not exceed the important workload utilization threshold value, the second time interval occurring later than the first time interval; and remap handling of the one or more interrupt types from the second processor unit back to the first processor unit.

Example 34 comprises the computing device of any of Examples 21-33, wherein the first processor unit and the second processor unit have different processor unit types.

Example 35 comprises the computing device of any of Examples 21-33, wherein the first processor unit and the second processor unit are part of an integrated circuit component.

Example 36 is a processor unit comprising: execution logic; and one or more non-transitory computer-readable media having instructions that, when executed, cause the execution logic to: in response to receiving, at the processor unit, an instruction to place the processor unit in a first idle state, place the processor unit in a second idle state if an interrupt handling rate for the processor unit exceeds an interrupt handling rate threshold value, the second idle state being a shallower idle state than the first idle state; and place the processor unit in the first idle state if the interrupt handling rate for the processor unit does not exceed the interrupt handling rate threshold value.

Example 37 comprises the processor unit of Example 36, the instructions to further cause the execution logic to determine the interrupt handling rate for the processor unit.

Example 38 comprises the processor unit of Example 36 or 37, wherein the interrupt handling rate is to be determined over a time interval of a pre-determined length prior to the receiving of the instruction to place the processor unit into the first idle state.

Example 39 comprises the processor unit of any one of Examples 36-38, wherein the interrupt handling rate is to be determined over a time interval since the processor unit last entered an active state.

Example 40 comprises the processor unit of any one of Examples 36-39, the instructions to further cause the execution logic to: transition the processor unit from the second idle state to an active state; handle an interrupt by the processor unit; and transition the processor unit from the active state back to the second idle state after the interrupt has been handled by the processor unit.

We claim:

1. A method comprising:
during operation of a computing device:
determining that a first important workload utilization rate determined over a first time interval for a first processor unit executing a workload exceeds an important workload utilization threshold value, the first important workload utilization rate based on instructions associated with any processes or threads executing on the first processor unit, the first processor unit designated to handle one or more interrupt types;

remapping handling of the one or more interrupt types from the first processor unit to a second processor unit;

continuing to execute the workload on the first processor unit after remapping handling of the one or more interrupt types from the first processor unit to the second processor unit;

determining that a second important workload utilization rate for the first processor unit determined over a second time interval does not exceed the important workload utilization threshold value, the second time interval occurring later than the first time interval; and remapping handling of the one or more interrupt types from the second processor unit back to the first processor unit.

2. The method of claim 1, further comprising:

receiving an interrupt having an interrupt type of one of the one or more interrupt types; and handling the interrupt by the second processor unit.

3. The method of claim 1, wherein the remapping comprises modifying an interrupt remapping table.

4. The method of claim 1, further comprising determining the first important workload utilization rate for the first processor unit.

5. The method of claim 4, wherein the first important workload utilization rate is determined based on a process priority or a thread priority associated with instructions performed by the first processor unit over the first time interval.

6. The method of claim 4, wherein the first important workload utilization rate is determined based on whether instructions executed by the first processor unit during the first time interval are associated with a foreground application.

7. The method of claim 1, wherein the second processor unit belongs to a plurality of processor units, the method further comprising selecting the second processor unit from the plurality of processor units.

8. The method of claim 7, wherein the second processor unit is selected from the plurality of processor units based on an idle state of the second processor unit being shallower than an idle state of at least one other processor unit of the plurality of processor units.

9. The method of claim 7, wherein the second processor unit is selected based on a processor unit type of the second processor unit.

10. A computing device comprising:

one or more processor units; and one or more non-transitory computer-readable media having instructions stored thereon that, when executed, cause the one or more processor units to:

during operation of the computing device:

determine that a first important workload utilization rate determined over a first time interval for a first processor unit executing a workload exceeds an important workload utilization threshold value, the first important workload utilization rate based on instructions associated with processes or threads executing on the first processor unit, the first processor unit designated to handle one or more interrupt types;

remap handling of the one or more interrupt types from the first processor unit to a second processor unit, wherein the one or more processor units comprise the first processor unit;

continue to execute the workload on the first processor unit after remapping handling of the one or more interrupt types from the first processor unit to the second processor unit;

determine that a second important workload utilization rate for the first processor unit determined over a second time interval does not exceed the important workload utilization threshold value, the second time interval occurring later than the first time interval; and remap handling of the one or more interrupt types from the second processor unit back to the first processor unit.

11. The computing device of claim 10, wherein the instructions are to further cause the one or more processor units to:

receive an interrupt having an interrupt type of one of the one or more interrupt types; and handle the interrupt by the second processor unit.

12. The computing device of claim 10, wherein to remap handling of the one or more interrupt types comprises to modify an interrupt remapping table.

13. The computing device of claim 10, wherein the instructions are to further cause the one or more processor units to determine the first important workload utilization rate for the first processor unit.

14. The computing device of claim 13, wherein the first important workload utilization rate is to be determined based on whether instructions executed by the first processor unit during a time interval for which the first important workload utilization rate is determined are associated with a user-initiated task.

15. The computing device of claim 13, wherein the first important workload utilization rate is to be determined based on whether instructions executed by the first processor unit during a time interval for which the first important workload utilization rate is determined are operating at an elevated privilege.

16. The computing device of claim 10, wherein the second processor unit belongs to a plurality of processor units, wherein the instructions are to further cause the one or more processor units to select the second processor unit from the plurality of processor units.

17. The computing device of claim 16, wherein the second processor unit is to be selected from the plurality of processor units based on an idle state of the second processor unit being shallower than an idle state of at least one other processor unit of the plurality of processor units.

18. The computing device of claim 10, wherein the first processor unit and the second processor unit have different processor unit types.

19. The computing device of claim 10, wherein the first processor unit and the second processor unit are part of an integrated circuit component.

20. One or more non-transitory computer-readable storage media having instructions stored thereon that, when executed, cause one or more processor units of a computing device to:

during operation of the computing device:

determine that a first important workload utilization rate determined for a first time interval for a first processor unit executing a workload exceeds an important workload utilization threshold value, the first important workload utilization rate based on instructions associated with processes or threads executing on the first processor unit, the first processor unit designated to handle one or more interrupt types;

remap handling of the one or more interrupt types from the first processor unit to a second processor unit, wherein the first processor unit and the second processor unit belong to the one or more processor units;

continue to execute the workload on the first processor unit after remapping handling of the one or more interrupt types from the first processor unit to the second processor unit;

determine that a second important workload utilization rate for the first processor unit determined over a second time interval does not exceed the important workload utilization threshold value, the second time interval occurring later than the first time interval; and remap handling of the one or more interrupt types from the second processor unit back to the first processor unit.

21. The one or more non-transitory computer-readable storage media of claim 20, wherein the instructions are to further cause the one or more processor units to:

receive an interrupt having an interrupt type of one of the one or more interrupt types; and handle the interrupt by the second processor unit.

22. The one or more non-transitory computer-readable storage media of claim 20, wherein to remap handling of the one or more interrupt types comprises to modify an interrupt remapping table.

23. The method of claim 1, wherein the first processor unit is a high-performance processor unit and the second processor unit is a high-efficiency processor unit.

24. The computing device of claim 10, wherein the first processor unit is a high-performance processor unit and the second processor unit is a high-efficiency processor unit.

25. The one or more non-transitory computer-readable storage media of claim 20, wherein the first processor unit is a high-performance processor unit and the second processor unit is a high-efficiency processor unit.

\* \* \* \* \*